US009777671B2

(12) United States Patent
Ramlaoui et al.

(10) Patent No.: US 9,777,671 B2
(45) Date of Patent: Oct. 3, 2017

(54) ACTUATION SYSTEM FOR A TRANSLATING VARIABLE AREA FAN NOZZLE

(71) Applicants: Rohr, Inc., Chula Vista, CA (US); Goodrich Actuation Systems Limited, Wolverhampton, West Midlands (GB)

(72) Inventors: Jihad I. Ramlaoui, Chula Vista, CA (US); Geoffrey Pinto, San Diego, CA (US); Daniel Shetzer, San Diego, CA (US); Daniel M. Amkraut, San Diego, CA (US); Andrew Robert Hawksworth, Shropshire (GB); John Harvey, Wolverhampton (GB); Alan K. Evans, Wolverhampton (GB); Vikram Chandarana, Wolverhampton (GB); Roger Moorhouse, South Staffordshire (GB)

(73) Assignee: ROHR, INC., Chula Vista, CA (US)

( * ) Notice: Subject to any disclaimer, the term of this patent is extended or adjusted under 35 U.S.C. 154(b) by 1448 days.

(21) Appl. No.: 13/769,599

(22) Filed: Feb. 18, 2013

(65) Prior Publication Data
US 2013/0161414 A1 Jun. 27, 2013
US 2016/0169158 A9 Jun. 16, 2016

Related U.S. Application Data

(60) Division of application No. 12/485,559, filed on Jun. 16, 2009, now Pat. No. 8,511,062, which is a
(Continued)

(51) Int. Cl.
*F02K 1/09* (2006.01)
*F02K 1/64* (2006.01)
(Continued)

(52) U.S. Cl.
CPC ............... *F02K 1/763* (2013.01); *F02K 1/09* (2013.01); *F02K 1/72* (2013.01); *F02K 1/70* (2013.01)

(58) Field of Classification Search
CPC ... F02K 3/06; F02K 3/075; F02K 1/09; F02K 1/70; F02K 1/72; F02K 1/763; B66F 3/10; B66F 3/20
(Continued)

(56) References Cited

U.S. PATENT DOCUMENTS 2,950,595 A * 8/1960 Laucher .............. F02K 1/625
239/265.31
3,024,605 A 3/1962 Nash
(Continued)

FOREIGN PATENT DOCUMENTS

| CN | 1492129 | 4/2004 |
|---|---|---|
| CN | 1519170 | 8/2004 |

(Continued)

OTHER PUBLICATIONS

Office Action dated May 13, 2016 in U.S. Appl. No. 13/770,455.
(Continued)

*Primary Examiner* — Pascal M Bui Pho
*Assistant Examiner* — Rene Ford
(74) *Attorney, Agent, or Firm* — Snell & Wilmer, L.L.P.

(57) ABSTRACT

A variable area fan nozzle assembly for a turbofan engine includes a nacelle having an aft edge and a translating thrust reverser sleeve with a trailing edge. The thrust reverser sleeve is movably disposed aft of the nacelle's aft edge and is movable between a forward position and an aft position. A translating fan nozzle having a forward edge is movably disposed behind the trailing edge, and is movable between a stowed position and a deployed position. An upstream bypass flow exit is defined between the trailing edge and the
(Continued)

forward edge when the fan nozzle is in the deployed position. An extendable actuation system is configured to move the fan nozzle between the stowed position and the deployed position.

8 Claims, 15 Drawing Sheets

Related U.S. Application Data continuation-in-part of application No. PCT/US2008/072448, filed on Aug. 7, 2008.

(60) Provisional application No. 60/954,756, filed on Aug. 8, 2007.

(51) Int. Cl.
   *F02K 1/72* (2006.01)
   *F02K 1/76* (2006.01)
   *F02K 1/70* (2006.01)

(58) Field of Classification Search
   USPC ....... 74/424.71, 89.23, 424.72, 89.25, 89.27, 74/89.28, 89.29, 89.3, 89.31
   See application file for complete search history.

(56) References Cited

U.S. PATENT DOCUMENTS

| | | | |
|---|---|---|---|
| 3,360,308 A | 12/1967 | Grabowski et al. | |
| 3,404,581 A | 10/1968 | Kraus | |
| 3,460,762 A | 8/1969 | Weise | |
| 3,511,055 A | 5/1970 | Timms | |
| 3,665,709 A | 5/1972 | Medawar et al. | |
| 3,747,341 A | 7/1973 | Davis | |
| 3,779,010 A * | 12/1973 | Chamay | F02K 1/09 239/265.31 |
| 3,797,785 A | 3/1974 | Baerresen et al. | |
| 3,820,719 A * | 6/1974 | Clark | F02K 1/66 239/265.31 |
| 3,981,450 A | 9/1976 | McCardle et al. | |
| 4,145,877 A | 3/1979 | Montgomery | |
| 4,337,868 A * | 7/1982 | Gattu | B66C 23/706 212/264 |
| 4,375,276 A | 3/1983 | Konarski | |
| 4,407,120 A | 10/1983 | Timms | |
| 4,519,561 A | 5/1985 | Timms | |
| 4,521,707 A * | 6/1985 | Baker | F16H 25/20 310/112 |
| 4,682,930 A * | 7/1987 | Hachisu | B25J 18/02 212/204 |
| 4,807,434 A | 2/1989 | Jurich | |
| 4,922,713 A * | 5/1990 | Barbarin | F02K 1/72 239/265.31 |
| 5,050,803 A | 9/1991 | Wakeman et al. | |
| 5,090,197 A | 2/1992 | Dubois | |
| 5,174,502 A | 12/1992 | Lippmeier et al. | |
| 5,181,676 A | 1/1993 | Lair | |
| 5,209,057 A | 5/1993 | Remlaoui | |
| 5,211,008 A * | 5/1993 | Fage | F02K 1/74 239/265.19 |
| 5,228,641 A * | 7/1993 | Remlaoui | F02K 1/72 239/265.31 |
| 5,285,637 A | 2/1994 | Barcza | |
| 5,297,387 A * | 3/1994 | Carimali | F02K 1/563 239/265.29 |
| 5,313,788 A | 5/1994 | Wright et al. | |
| 5,328,098 A | 7/1994 | Barcza et al. | |
| 5,404,714 A | 4/1995 | Davies | |
| 5,547,130 A | 8/1996 | Davies | |
| 5,575,147 A | 11/1996 | Nikkanen | |
| 5,655,360 A * | 8/1997 | Butler | F02K 1/72 239/265.29 |
| 5,778,659 A | 7/1998 | Duesler | |
| 5,806,302 A * | 9/1998 | Cariola | F02K 1/09 239/265.29 |
| 5,833,140 A | 11/1998 | Loffredo | |
| 5,937,699 A * | 8/1999 | Garrec | B25J 18/025 74/89.35 |
| 5,960,626 A | 10/1999 | Baudu et al. | |
| 5,996,937 A | 12/1999 | Gonidec et al. | |
| 6,079,201 A | 6/2000 | Jean | |
| 6,167,694 B1 | 1/2001 | Davies | |
| 6,170,254 B1 * | 1/2001 | Cariola | B64C 25/423 244/110 B |
| 6,199,772 B1 | 3/2001 | Renggli | |
| 6,318,070 B1 | 11/2001 | Rey et al. | |
| 6,389,915 B1 * | 5/2002 | Wngett | B64C 13/00 74/424.71 |
| 6,435,048 B1 * | 8/2002 | Zimmerman | A47B 9/04 108/147 |
| 6,474,059 B2 | 11/2002 | Stretton | |
| 6,487,845 B1 | 12/2002 | Modglin et al. | |
| 6,513,398 B1 * | 2/2003 | Finkemeyer | A47C 20/041 192/141 |
| 6,584,763 B2 | 7/2003 | Lymons et al. | |
| 6,625,972 B1 | 9/2003 | Sternberger | |
| 6,681,559 B2 | 1/2004 | Johnson | |
| 6,751,944 B2 | 6/2004 | Lair | |
| 6,824,101 B2 | 11/2004 | Sternberger et al. | |
| 6,845,945 B1 | 1/2005 | Smith | |
| 6,895,742 B2 | 5/2005 | Lair et al. | |
| 6,945,031 B2 | 9/2005 | Lair | |
| 6,966,175 B2 | 11/2005 | Lair | |
| 6,968,675 B2 | 11/2005 | Ramlaoui | |
| 6,971,229 B2 | 12/2005 | Lair | |
| 6,976,352 B2 | 12/2005 | Lair | |
| 7,007,454 B2 | 3/2006 | Dehu et al. | |
| 7,010,905 B2 | 3/2006 | Lair | |
| 7,093,793 B2 | 8/2006 | Lair | |
| 7,096,661 B2 | 8/2006 | Bush et al. | |
| 7,127,880 B2 | 10/2006 | Lair et al. | |
| 7,146,796 B2 | 12/2006 | Lair | |
| 7,174,828 B2 | 2/2007 | Davies | |
| 7,185,868 B2 * | 3/2007 | Wang | A47F 5/04 248/125.1 |
| 7,264,203 B2 | 9/2007 | Lair | |
| 7,818,958 B2 | 10/2010 | Bulin et al. | |
| 8,006,479 B2 | 8/2011 | Stern | |
| 8,104,261 B2 | 1/2012 | Marshall et al. | |
| 8,127,531 B2 | 3/2012 | Parham | |
| 8,127,532 B2 | 3/2012 | Howe | |
| 8,733,080 B2 * | 5/2014 | Jones | F02K 1/09 239/265.31 |
| 2002/0162410 A1 * | 11/2002 | Zimmerman | A47B 9/04 74/89.35 |
| 2004/0079073 A1 | 4/2004 | Ramlaoui et al. | |
| 2004/0195432 A1 * | 10/2004 | Christensen | F02K 1/766 244/10 |
| 2005/0188676 A1 | 9/2005 | Lair | |
| 2005/0204742 A1 | 9/2005 | Lair | |
| 2007/0294996 A1 | 12/2007 | Stephan et al. | |
| 2008/0000235 A1 | 1/2008 | Hanson | |
| 2008/0001039 A1 | 1/2008 | Winter et al. | |
| 2008/0072571 A1 | 3/2008 | Beardsley et al. | |
| 2008/0084130 A1 | 4/2008 | Darby | |
| 2008/0163606 A1 | 7/2008 | Cini et al. | |
| 2009/0013664 A1 | 1/2009 | Jones et al. | |
| 2009/0053058 A1 | 2/2009 | Kohlenberg | |
| 2009/0288386 A1 * | 11/2009 | Marshall | F02K 1/09 60/204 |
| 2010/0031630 A1 | 2/2010 | Bulin et al. | |
| 2010/0064659 A1 | 3/2010 | Wang | |
| 2010/0139242 A1 | 6/2010 | Vauchel et al. | |
| 2010/0192715 A1 | 8/2010 | Vauchel et al. | |
| 2010/0205931 A1 | 8/2010 | Baudu et al. | |
| 2010/0229527 A1 | 9/2010 | Amkraut et al. | |
| 2010/0229528 A1 | 9/2010 | Ramlaoui et al. | |
| 2011/0023450 A1 | 2/2011 | Stuart et al. | |
| 2011/0120078 A1 | 5/2011 | Schwark et al. | |

(56) References Cited

U.S. PATENT DOCUMENTS

2011/0167790 A1 7/2011 Cloft et al.
2011/0296813 A1 12/2011 Frank et al.
2012/0193441 A1 8/2012 Parham

FOREIGN PATENT DOCUMENTS

| CN | 101274664 | 10/2008 | |
| EP | 0779429 A2 * | 6/1997 | ............... F02K 1/08 |
| EP | 1004798 | 5/2000 | |
| GB | 841110 | 7/1960 | |
| WO | 03072922 | 9/2003 | |

OTHER PUBLICATIONS

Office Action dated Oct. 2, 2014 in U.S. Appl. No. 12/672,565.
Final Office Action dated Jul. 28, 2015 in U.S. Appl. No. 12/672,565.
Advisory Action dated Oct. 2, 2015 in U.S. Appl. No. 12/672,565.
Office Action dated Dec. 4, 2015 in U.S. Appl. No. 12/672,565.
Final Office Action dated May 20, 2016 in U.S. Appl. No. 12/672,565.
Office Action dated Nov. 26, 2013 in Chinese Application No. 201010156573.5.
Search Report dated Sep. 18, 20130 in European Application No. 12002710.7.
Search Report dated Mar. 12, 2013 in European Application No. 12197068.5.
Notice of Allowance dated Mar. 15, 2013 in U.S. Appl. No. 12/419,080.
Notice of Allowance dated Dec. 20, 2012 in U.S. Appl. No. 12/485,551.
Notice of Allowance dated Nov. 13, 2012 in U.S. Appl. No. 12/485,559.
Advisory Action dated Aug. 9, 2016 in U.S. Appl. No. 12/672,565.

* cited by examiner

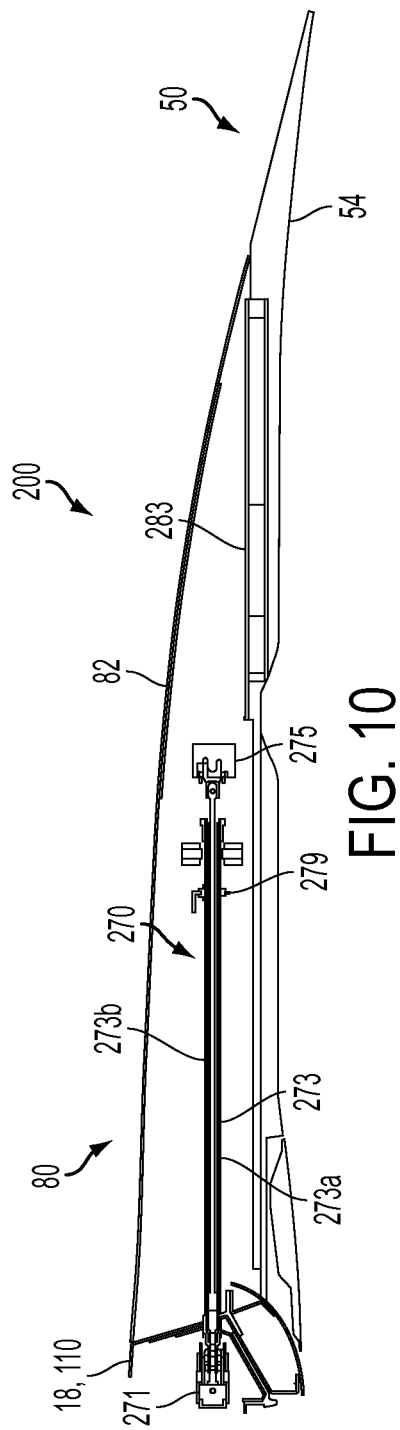
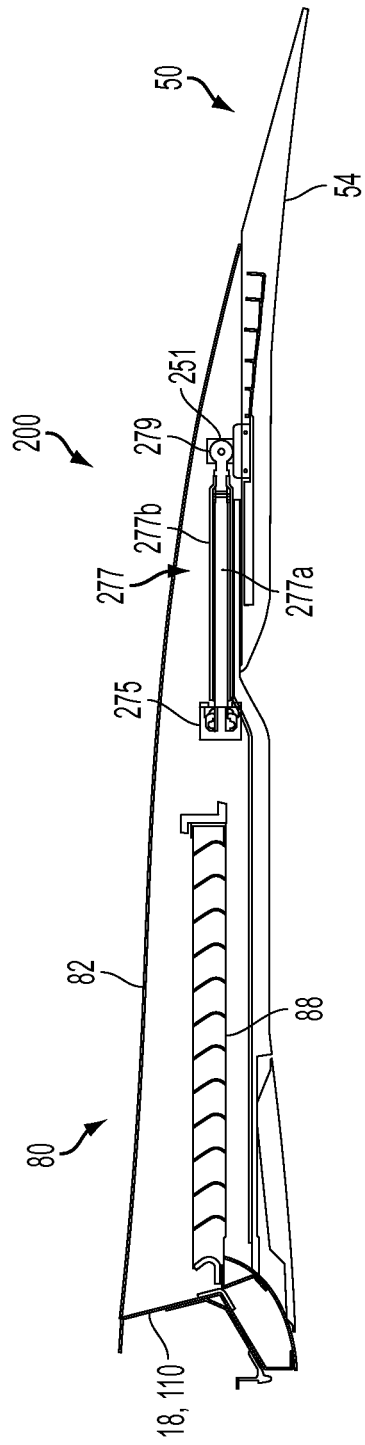

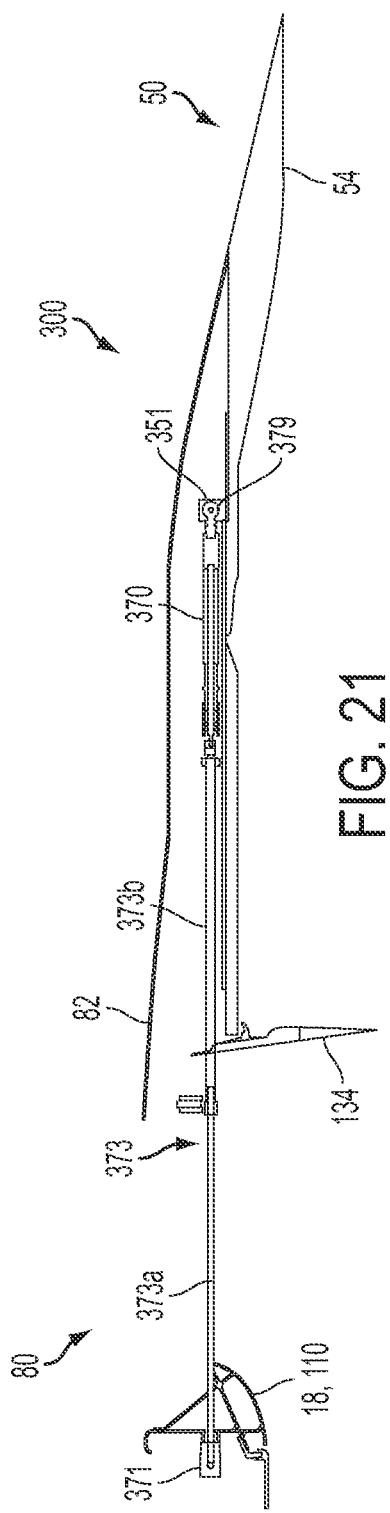
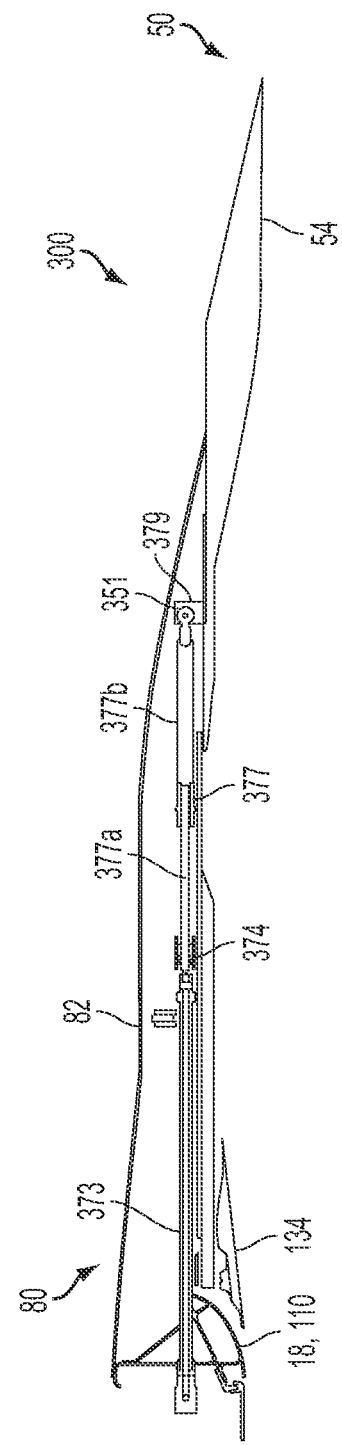

ACTUATION SYSTEM FOR A TRANSLATING VARIABLE AREA FAN NOZZLE

RELATED APPLICATIONS

This application is a divisional of U.S. application Ser. No. 12/485,559, filed Jun. 16, 2009, which is a continuation-in-part of international application Serial No. PCT/US08/72448, filed Aug. 7, 2008, which claims the benefit of priority of U.S. Provisional Application Ser. No. 60/954,756, filed Aug. 8, 2007, the disclosures of which are hereby incorporated by reference in their entireties.

TECHNICAL FIELD

The present invention generally relates to gas turbine aircraft engines, and particularly relates to an actuation system for a translating variable area nozzle assembly for a turbofan aircraft engine for use in selectively controlling the fan bypass flow exhausted from the engine in order to adjust the engine's performance under varying flight conditions.

BACKGROUND

Typical aircraft turbofan jet engines include a fan that draws and directs a flow of air into a nacelle and into and around an engine core. The nacelle surrounds the engine core and helps promote the laminar flow of air around the core. The flow of air that is directed into the engine core is initially passed through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine.

Bypass flow is air that is directed around the engine core. In turbofan engines, the bypass flow typically provides the main thrust for an aircraft. The bypass flow also can be used to help slow a landed aircraft. Thrust reversers mounted in the nacelle structure selectively reverse the direction of the bypass flow to generate reverse thrust. During normal engine operation, the bypass flow may or may not be mixed with the engine core exhaust before exiting the engine assembly.

Several turbofan engine parameters are important to optimize design characteristics and performance. An engine's bypass ratio (BPR) is the ratio of the air mass that passes through the engine's fan duct to that passing through the engine core. Higher BPR engines can be more efficient and quiet than lower BPR engines. In general, a higher BPR results in lower average exhaust velocities and less jet noise at a specific thrust rating. A turbofan engine's performance is also affected by the engine's fan pressure ratio (FPR). FPR is the ratio of the air pressure at the engine's fan nozzle exit to the pressure of the air entering the fan. The lower the FPR, the lower the exhaust velocity, and the higher an engine's propulsive efficiency. Reducing an engine's FPR can reach a practical limit, however, as a low FPR can cause engine fan stall, blade flutter or compressor surge under certain operating conditions.

One solution to these problems includes varying the fan nozzle exit area of a high-BPR engine during operation to optimize engine performance under various flight conditions. By selectively varying the fan nozzle's exit area, an engine's bypass flow characteristics can be adjusted to match a particular flight condition. Unfortunately, prior variable area nozzle systems typically have been heavy, expensive and somewhat complex in their structure and operation, and generally require the coordinated movement of multiple components that employ complex drive mechanisms.

Accordingly, a need exists for a variable area nozzle assembly for turbofan aircraft engine that promotes a cost effective, simple and efficient operation for control of engine output under certain flight conditions. In particular, there is a need for an actuation system for selectively translating a nozzle of such a variable area nozzle assembly.

SUMMARY

In one embodiment, a variable area fan nozzle assembly for a turbofan engine includes a nacelle having an aft edge and a translating thrust reverser sleeve having a trailing edge. The thrust reverser sleeve can be movably disposed aft of the nacelle's aft edge and can be movable between a forward position and an aft position. The variable area fan nozzle assembly can further include a translating nozzle having a forward edge. The fan nozzle can be movably disposed behind the trailing edge, and can be movable between a stowed position and a deployed position. An upstream bypass flow exit can be defined between the trailing edge and the forward edge when the fan nozzle is in the deployed position. The variable area fan nozzle assembly can also include an actuation system for selectively moving the fan nozzle between the stowed position and the deployed position. The actuation system can include a power drive unit, at least one extensible actuator disposed between the thrust reverser sleeve and the fan nozzle, and at least one telescoping coupling disposed between the thrust reverser sleeve and the nacelle. The extensible actuator can be rotatably coupled to the power drive unit through the telescoping coupling.

In another embodiment, an actuator for a translating variable area fan nozzle includes an extensible portion comprising a jack screw and a translating threaded sleeve threadably engaged with the jack screw. A telescoping coupling can be rotatably coupled to the extensible actuator. The length of the telescoping coupling may be altered between a first length and a second length that is longer than the first length while rotational engagement with the extensible actuator is maintained.

In a further embodiment, an actuator system for selectively displacing a translating variable area fan nozzle between a stowed position and a deployed position includes at least one actuator having a jack screw and a telescoping coupling. A power drive unit can be operably connected to the jack screw through the telescoping coupling.

In another embodiment, an actuator system for a variable area fan nozzle includes a jack screw actuator having an input end, and a power drive unit. The actuator system can also include means for coupling the power drive unit to the input end of the jack screw actuator. The means for coupling can be configured to accommodate substantial translational displacement between the input end of the jack screw actuator and the power drive unit.

The foregoing and other features, aspects, and advantages of the invention will be apparent from a reading of the following detailed description together with the accompanying drawings, which are briefly described below.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

FIG. 10 is a cross-sectional view of the portion of the VAFN actuation system shown in FIG. 9 taken along line 10-10 and showing the thrust reverser and VAFN nozzle in their stowed positions.

FIG. 11 is a cross-sectional view of the portion of the actuation system shown in FIG. 9 taken along line 11-11 and showing the thrust reverser and VAFN nozzle in their stowed positions.

FIG. 21 is a cross sectional view of an actuator portion of the second embodiment of a VAFN actuation system showing a thrust reverser in a deployed position and a VAFN nozzle in a stowed position.

FIG. 22 is another cross sectional view of the actuator portion of the second embodiment of a VAFN actuation system showing the thrust reverser in a stowed position and the VAFN nozzle in a deployed position.

DETAILED DESCRIPTION

FIGS. 1-8 show one embodiment of a translating variable area fan nozzle assembly (VAFN) for a turbofan engine 10.

Figure 1:
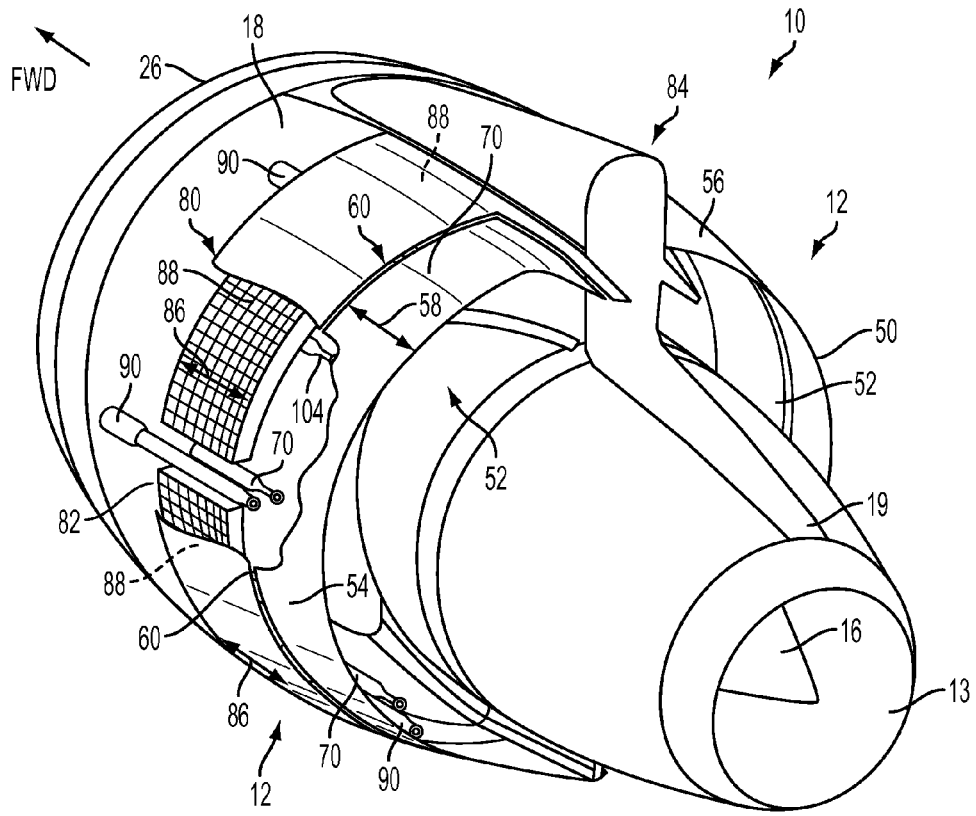
FIG. 1 is a perspective view of an aircraft engine having a cascade-type thrust reverser and a translating variable area fan nozzle assembly.
Figure 2:
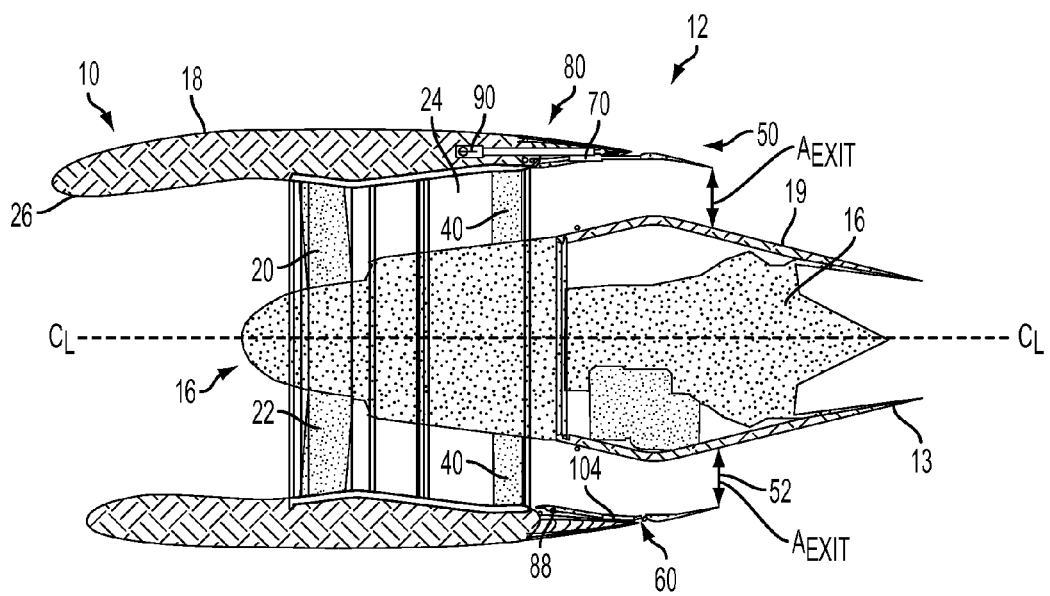
FIG. 2 is a longitudinal cross section of an aircraft engine.

Referring to FIGS. 1 and 2, the engine 10 includes a trailing edge fan nozzle assembly 12 having a translating nozzle 50 that can be selectively adjusted, for example, as the engine 10 operates under different flight conditions. As discussed above, such an adjustment can be used to optimize an engine's performance. As shown in FIG. 2, the translating nozzle 50 can be selectively translated (i.e., moved fore and aft) to vary the fan nozzle's exit area "$A_{exit}$" in order to optimize engine performance, and as described in detail below, to adjust an amount of engine bypass flow spilled through an upstream exit 60 formed by the variable area fan nozzle assembly 12. By bleeding or spilling off excess fan flow through the upstream exit 60 before the excess air flow reaches the primary fan nozzle exit 52, lower fan pressure ratios for the same amount of delivered mass flow can be obtained, thereby increasing stall margins and avoiding engine malfunction and shutdown. For purposes of illustration, the variable area fan nozzle assembly 12 is shown in the context of a turbofan jet aircraft engine 10. The engine 10 can be mounted to a wing or fuselage of an aircraft, for example, by a pylon or other similar support (not shown in the figures).

As shown in FIG. 2, the engine 10 includes an engine core 16 and a stationary nacelle 18 surrounding the core 16. The engine core 16 is housed within a core cowl 19. The engine's fan 20 is positioned within an upstream portion of the nacelle 18, and includes a plurality of fan blades 22 that are mounted on the engine's rotor (not shown). The fan blades 22 rotate about the engine's centerline $C_L$ and draw a flow of air into an inlet end 26 of the engine 10. An annular bypass duct 24 is defined between the engine core 16 and the nacelle 18. The air flow drawn into the engine 10 is accelerated by the rotating fan blades 22, and a portion of the incoming air flow is directed into and through the engine core 16.

Bypass flow enters the upstream end of the nacelle 18 and flows around and past the engine core 16. The bypass flow is accelerated by the rotating fan blades 22 and passes through the bypass duct 24 and past stators 40, and exits the engine 10 through the variable area fan nozzle assembly 12. The high-pressure heated exhaust gases from the combustion of the fuel and air mixture exit the engine core 16 through a primary exhaust nozzle 13 at the aft end of the engine 10.

Figure 3:
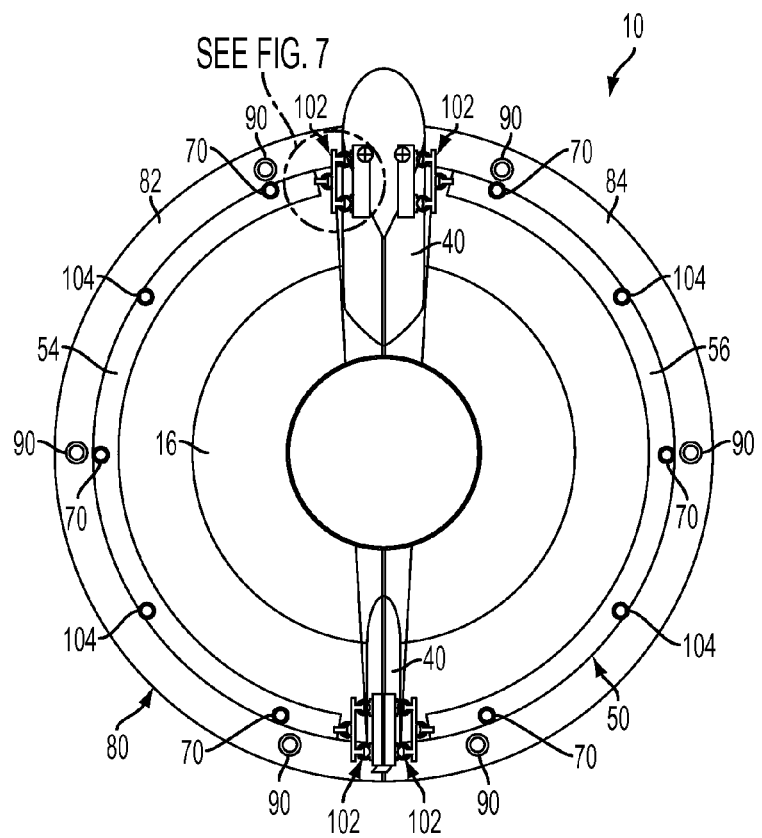
FIG. 3 is a rear elevation of an aircraft engine.

In the engine assembly 10 shown in FIGS. 1-8, the translating nozzle 50 is a nozzle-like annular airfoil structure mounted at the trailing end of a cascade-type thrust reverser 80 that circumscribes the engine core cowl 19 immediately aft of the nacelle 18. As shown in FIG. 2, a downstream nozzle exit 52 between the trailing edge of the fan nozzle 50 and the core cowl 19 defines a fan nozzle exit area "$A_{exit}$". Due to the longitudinal variations in the diameter of the core cowl 19, selective fore and aft movement of the translating nozzle 50 changes the size of the fan nozzle exit area $A_{exit}$. As shown in FIG. 1, the fan nozzle 50 can include a first arcuate nozzle section 54 and a second arcuate nozzle section 56, each nozzle section 54, 56 being axially translatable in the direction of the bidirectional arrow 58. Translation of the translating nozzle 50 effects a desired size of the upstream exit 60 (shown in FIG. 2), and also varies the outlet geometry and effective exit area $A_{exit}$ of the downstream nozzle exit 52. Hence, when the translating nozzle 50 is deployed, there is an increase in the bypass flow that is discharged from the engine assembly 10 through both the upstream exit 60 and the enlarged downstream nozzle exit 52. As shown in FIGS. 1-3, the translating nozzle 50 can be selectively translated fore and aft by a plurality of linear nozzle actuators 70, for example.

The cascade-type thrust reverser 80 can be positioned forward of the translating nozzle 50 in order to selectively block and redirect bypass flow from the bypass duct 24 in a manner known in the art. In FIG. 1, the thrust reverser 80 and the translating nozzle 50 are both in their stowed positions. As shown in FIG. 3, the thrust reverser 80 can include a first arcuate sleeve section 82 and an opposed second arcuate sleeve section 84. As indicated by bi-directional arrow 86 in FIG. 1, the thrust reverser sleeve sections 82, 84 can be translated in the fore and aft directions by a plurality of spaced sleeve actuators 90. In a stowed position, the thrust reverser sleeve sections 82, 84 cover an array of cascade vanes 88. The cascade vanes 88 are indicated by dashed lead lines in FIG. 1 because they are not visible when the thrust reverser 80 is in its stowed position. Axial translation of the thrust reverser sleeve sections 82, 84 in the aft direction to a deployed position and deployment of a series of blocker doors 134 (as indicated by directional arrow 136 in FIG. 8) within the bypass duct 24 causes bypass air flow to exit the bypass duct 24 through the cascade vanes 88 which turn the exiting flow in a generally forward direction to create reverse thrust.

FIG. 3 is a partial section view of the aft end of engine 10, and illustrates one arrangement of the nozzle and sleeve actuators 70, 90, respectively, around the periphery of the engine 10. As shown in FIG. 1, and more clearly in FIG. 3, the sleeve half section 82 and the nozzle half-section 54 cooperate to generally define an approximately 180-degree sector of the combined thrust reverser and translating nozzle structure. Likewise, sleeve half section 84 and nozzle half section 56 cooperate to generally define an opposed approximately 180-degree sector of the thrust reverser and translating nozzle structure. Together, these approximate 180-degree sectors cooperate to define the complete thrust reverser/translating nozzle structure.

Figure 7:
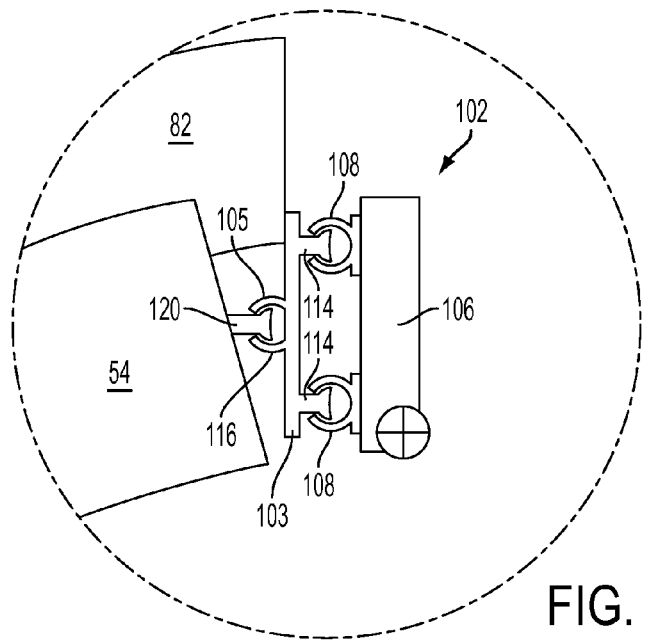
FIG. 7 is a cross sectional view of a track beam assembly for movably supporting a thrust reverser sleeve and a variable area fan nozzle ring.

As shown in FIGS. 1-3, the thrust reverser sleeve sections 82, 84 can each be selectively translated in the fore and aft directions by one or more circumferentially spaced sleeve actuators 90 that are connected to the nacelle 18. In the embodiment shown, three actuators 90 are used for each sleeve half-section 82, 84. As discussed above, each section 54, 56 of the translating nozzle 50 can be selectively translated by one or more circumferentially spaced nozzle actuators 70. In the embodiment shown, each nozzle actuator 70 is disposed between a thrust reverser sleeve section 82, 84 and a respective fan nozzle section 54, 56. The sleeve actuators 90 and the nozzle actuators 70 can be electrical, mechanical, pneumatic, hydraulic, or the like, and can be interconnected by appropriate power cables and conduits (not shown). The number and arrangement of nozzle and sleeve actuators 70, 90 can vary according to the thrust reverser and nozzle assembly configurations or other factors. As shown in FIG. 3, the nozzle sections 54, 56 can be movably mounted on the engine 10 by upper and lower track beam assemblies 102. (FIG. 7 shows a detail view of one embodiment of a track beam assembly 102.) As shown in FIGS. 1-3, guide tubes 104 can be mounted to the nacelle 18, and can extend into the nozzle sections 54, 56 to stabilize the nozzle sections 54, 56 against undesirable translation and/or vibration. In addition or alternatively, guide tubes can be used to stabilize the thrust reverser sleeves 82, 84.

The translating nozzle 50 can be a continuous nozzle (not shown in the figures), or as shown in FIG. 3, can include two or more arcuate nozzle sections having airfoil profiles. The upstream exit 60 shown in FIG. 2 is formed when the translating nozzle 50 is deployed in the aft direction away from the thrust reverser sleeve sections 82, 84, and can have the form of a generally circular annular gap. Alternatively, the upstream exit 60 can have other non-circular shapes. The gap 60 between the nozzle sections 54, 56 and the sleeve sections 82, 84 can be continuous, or can be interrupted at one or more locations, such as, for example, at points of separation between nozzle segments 54, 56 of the translating nozzle 50. As shown in FIGS. 2-3, the bypass duct 24 can be interrupted at one or more locations by one or more stators 40, or the like.

The translating nozzle 50 and surrounding structure are described below with reference to FIGS. 4-7. In FIGS. 4-7, elements that are obscured or partially obscured due to intervening elements are indicated by dashed lead lines.

Figure 4:
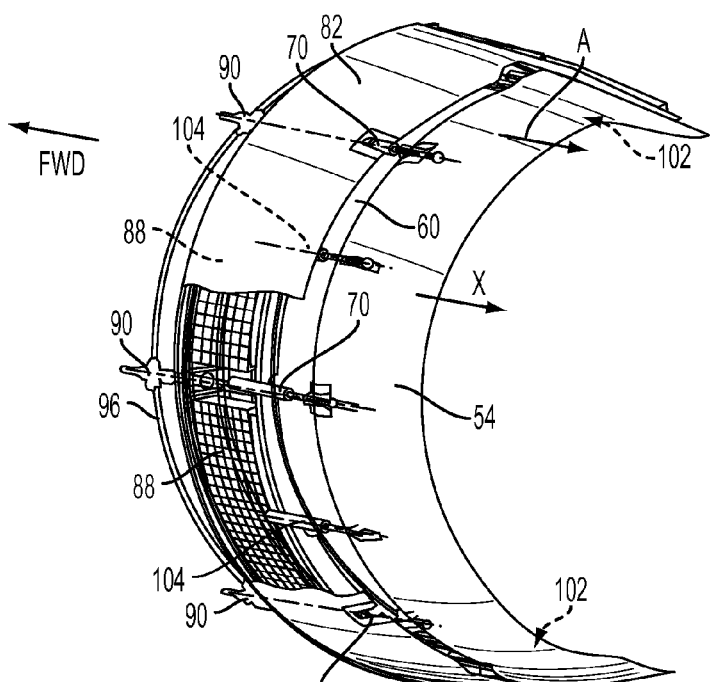
FIG. 4 is a perspective view of the thrust reverser and translating variable fan area nozzle assembly portions of an aircraft engine with a thrust reverser sleeve in a stowed position, and a variable area fan nozzle ring in a deployed position.
Figure 5:
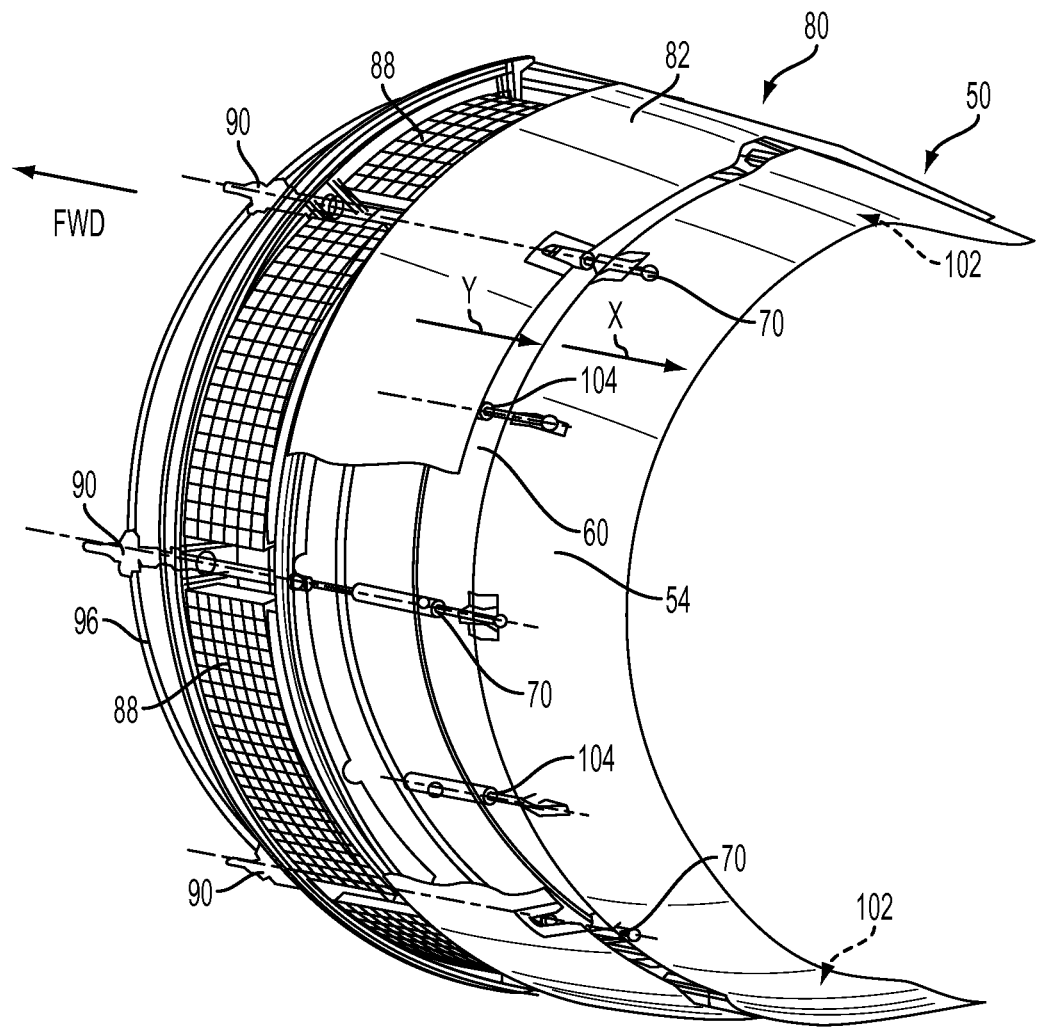
FIG. 5 is a perspective view of a thrust reverser and translating variable area fan nozzle assembly with both the thrust reverser sleeve and the variable area fan nozzle ring in deployed positions.

FIG. 4 is a partial view of one embodiment of a mounting structure for a first nozzle section 54 of the translating nozzle 50 and the corresponding, adjacent first sleeve section 82 of the thrust reverser 80. The second nozzle section 56 of the translating nozzle 50 and the second sleeve section 84 of the thrust reverser 80, which are shown in FIGS. 1 and 3, can be mounted in a similar manner (not shown). In FIG. 4, the thrust reverser 80 is in a stowed position, and the first sleeve section 84 covers an associated portion of the cascade vanes 88. Also in FIG. 4, the translating nozzle 50 is in an open or deployed position, and the upstream exit 60 is disposed between the first nozzle section 54 and the first sleeve section 84. Rearward axial translation of the first nozzle section 54 from its stowed position to its deployed position is indicated in FIGS. 4-5 by directional arrow "X". As shown in FIG. 4, the nozzle actuators 70 can extend from the sleeve section 82 and across the upstream exit 60, and can connect to a forward portion of the nozzle section 54. The guide tubes 104 can also extend from the sleeve section 82 and across the upstream exit 60, and can connect to a forward portion of the nozzle section 54. A flexible sleeve actuation shaft 96 can interconnect two or more of the sleeve actuators 90 to power the actuators 90, and/or to synchronize actuation of two or more actuators 90.

FIG. 5 shows the first thrust reverser sleeve section 82 and the first translating nozzle section 54 in their deployed positions. Rearward axial translation of the first sleeve section 82 from its stowed position (as shown in FIG. 4) to its deployed position (as shown in FIG. 5) is indicated in FIG. 5 by directional arrow "Y". Rearward translation of the sleeve section 82 exposes the cascade vanes 88 during operation of the thrust reverser 80.

Figure 6:
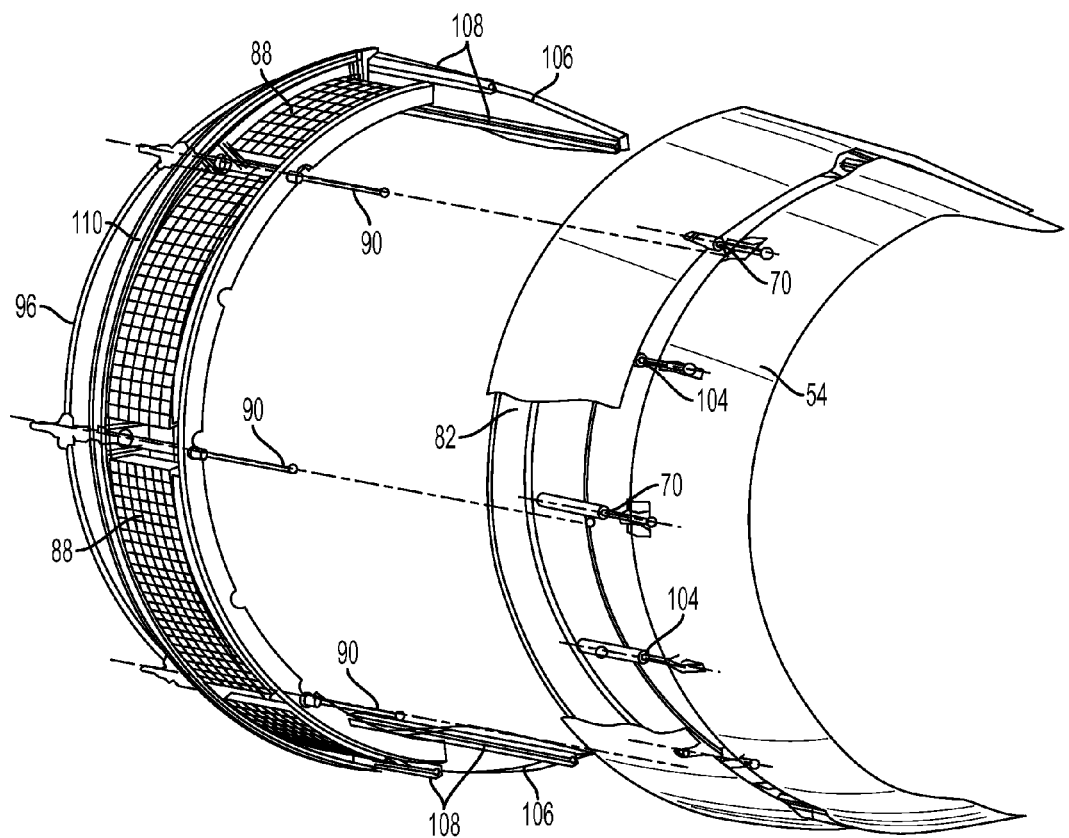
FIG. 6 is an exploded perspective view of the thrust reverser and translating variable area fan nozzle assembly shown in FIGS. 4-5.

FIG. 6 is an exploded view showing the first sleeve section 82 and its corresponding first nozzle section 54 separated from the cascades 88 and sleeve actuators 90. As shown in FIG. 6, one or more nozzle actuators 70 can movably connect the nozzle section 54 to the thrust reverser sleeve section 82.

FIG. 7 shows one embodiment of the upper or lower track beam assemblies 102 for movably connecting a thrust reverser segment 82 and a nozzle section 54 to an engine 10. Referring generally to FIGS. 3 and 6 and particularly to FIG. 7, the track beam assembly 102 can include a beam 106 that can be fixedly attached to a torque box 110 on an aft end of a nacelle 18. The beam 106 can include one or more longitudinally extending guide tracks 108. A slide 103 can include one or more longitudinally extending track bars 114 that are slidably received within the guide tracks 108 of the fixed beam 106. The slide 103 is connected to the thrust reverser sleeve section 82, and thereby slidably connects the sleeve section to the beam 106. The slide 103 can also include an axially extending track guide 116 in which a translating nozzle track bar 120 on the nozzle section 54 is slidably received, thus slidably connecting the nozzle section 54 to the nacelle 18. Accordingly, the nozzle section 54 can axially translate as the track bar 120 slides within the track guide 116. The nozzle section 54 is thereby slidably mounted with respect to the sleeve section 82 of the thrust reverser 80. The translating sleeve section 82 and the track bar 120 can be actuated through conventional actuation means, such as mechanical, electric, hydraulic or pneumatic or other equivalent actuators, for example.

Figure 8:
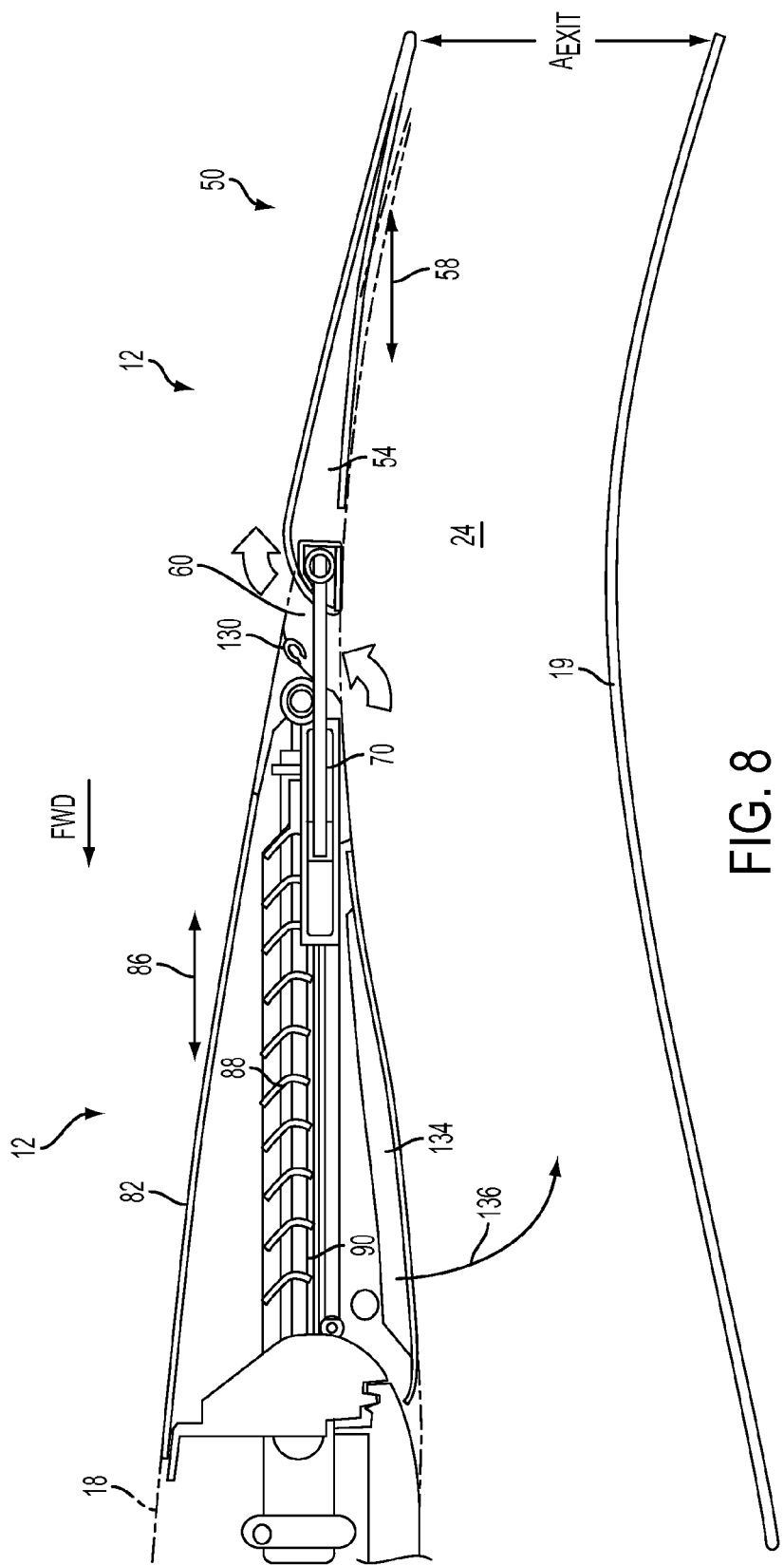
FIG. 8 is a partial cross sectional view of a thrust reverser and variable area nozzle assembly.

FIG. 8 illustrates one method of operating the nozzle section 54 to bleed or spill off excess bypass flow through the upstream exit 60. As described above, the sizes of the upstream exit 60 and the nozzle exit area $A_{exit}$ can be varied in order to achieve different engine operating conditions. FIG. 8 shows a partial section of a downstream portion of the nozzle assembly 12, and shows a portion of the bypass air flow (indicated by curved arrows) exiting the bypass duct 24 through the annular upstream exit 60 in one mode of operation of the nozzle assembly 12. In FIG. 8, the first nozzle section 54 of the translating nozzle 50 is rearwardly displaced from the first thrust reverser sleeve section 82 by its associated nozzle actuators 70. The second nozzle section 56 (shown in FIG. 3) can be similarly and simultaneously rearwardly displaced from the second thrust reverser sleeve section 84 by its associated nozzle actuators 70. As shown in FIG. 8, the thrust reverser 80 can include a plurality of blocker doors 134 that are pivotally connected to the first sleeve section 82 and swing in the direction of the curved arrow 136 to selectively block and redirect the bypass flow from the bypass duct 24 and through the cascade vanes 88 during thrust reverser operation.

Still referring to FIG. 8, a high pressure seal 130 can be disposed between the thrust reverser sleeve section 82 and the first nozzle section 54, such as on the trailing edge of the sleeve section 82, for example. In certain modes of operation, when the sleeve section 82 and nozzle section 54 are drawn together, the seal 130 can operate to substantially seal any gap between the adjacent sleeve section 82 and nozzle section 54, and thereby substantially prevent bypass air flow from passing between the sleeve section 82 and nozzle section 54. Similarly, a seal 130 can be disposed between the second thrust reverser sleeve section 84 and the second nozzle section 56. Alternatively, the seal 130 can be mounted on the leading edges of the nozzle sections 54, 56, for example.

Figure 9:
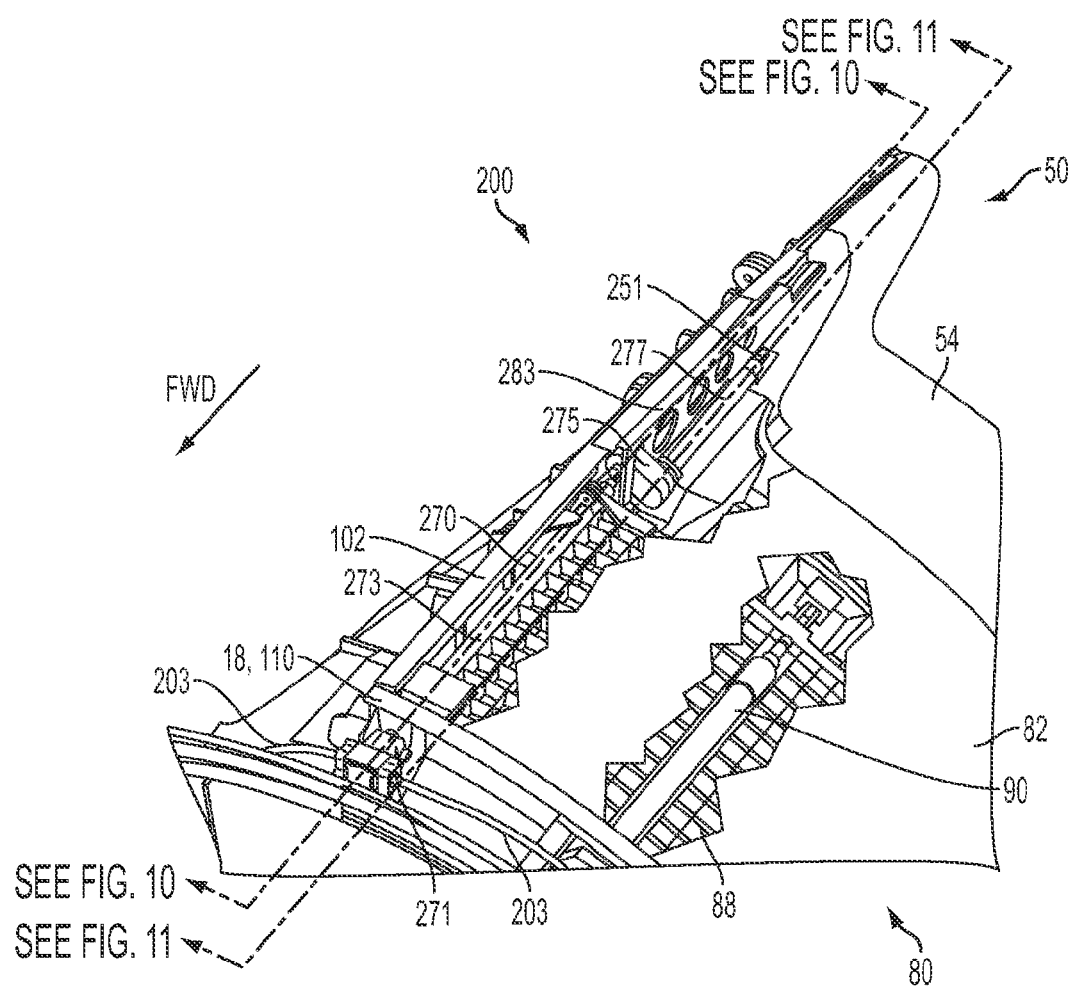
FIG. 9 is a perspective view of a portion of a first embodiment of a VAFN actuation system for selectively translating a variable area fan nozzle like that shown in FIGS. 1-8.

FIGS. 9-17 show one embodiment of a VAFN actuation system 200 for selectively translating a variable area fan nozzle 50 like that described above between its stowed and deployed positions. As shown in FIG. 9, a thrust reverser 80 can include at least one translating thrust reverser sleeve section 82 that is movably mounted aft of a stationary nacelle portion 18. Fore and aft translation of the thrust reverser sleeve section 82 can be effected by a plurality of thrust reverser actuators 90 that movably connect the sleeve section 82 to a torque box 110 on the aft end of the nacelle portion 18. When the thrust reverser actuators 90 are retracted, the thrust reverser sleeve section 82 is positioned immediately behind the torque ring 110 in a stowed position, and sleeve section 82 covers the cascade array 88. A fan nozzle segment 54 is movably disposed aft of the thrust reverser sleeve section 82. The fan nozzle segment 54 and the thrust reverser sleeve section 82 can be movably supported by a track beam assembly 102 like that shown in FIG. 7, for example.

As shown in FIG. 9, a VAFN actuation system 200 according to the invention can include one or more VAFN actuators 270. The VAFN actuator 270 can generally include a gear box 271, a telescoping coupling 273, and an extensible portion 277. The gear box 271 can be mounted to the torque box 110. In the embodiment shown in FIG. 9, the gear box 271 is located proximate to the track beam assembly 102. The telescoping coupling 273 is rotatably coupled to the gear box 271 and rearwardly extends between the gear box 271 and a jack head 275. The jack head 275 can be positioned proximate to an aft end of the thrust reverser sleeve segment 82, and can be coupled to a bracket 283 on the sleeve segment 82. Accordingly, the jack head 275 moves with the thrust reverser sleeve segment 82 as the sleeve segment 82 is moved between its stowed and deployed positions by the thrust reverser actuator 90. The extensible portion 277 of the VAFN actuator 270 is disposed between the jack head 275 and a support 251 on the fan nozzle segment 54. As described below, the extensible portion 277 is configured to move the fan nozzle segment 54 between its forward stowed position and its aft deployed position. In the embodiment shown in FIG. 9, the extensible portion 277 and the telescoping coupling 273 are laterally offset from each other due to an offset between the input and output of the jack head 275.

FIGS. 10-11 show the telescoping coupling 273 and the extensible portion 277 of the VAFN actuator 270 with both the thrust reverser sleeve segment 82 and the fan nozzle segment 54 in their stowed positions. As shown in FIG. 10, the telescoping coupling 273 can include a non-translating portion 273a and a movable portion 273b. In one embodiment, the non-translating portion 273a is an elongated sleeve or tube, and the movable portion 273b is an elongated shaft that is slidably received within the sleeve 273a. In the embodiment shown, a forward end of the sleeve 273a is rotatably coupled to the gear box 271, and an aft end of the shaft 273b is rotatably coupled to the jack head 275. An aft portion of the fixed sleeve 273a can be connected to an adjacent stationary structure by a bracket 279 or another device. Accordingly, the sleeve 273a remains stationary even as the thrust reverser sleeve section 82 moves aft toward its deployed position. As described below, the sleeve 273a and shaft 273b can be configured such that they are rotatably coupled together yet permit axial displacement of the shaft 273b within the sleeve 273a. Accordingly, when the sleeve 273a is rotated by the gear box 271, the shaft 273b also rotates. Though not shown in the figures, the orientation of the telescoping coupling 273 can be reversed such that an aft end of the sleeve 273a is rotatably coupled to the jack head 275 and a forward end of the shaft 273b is rotatably coupled to the gear box 271. As shown in FIG. 10, when the thrust reverser sleeve section 82 is in its stowed position, a substantial portion of the shaft 273b can be received within the sleeve 273a. Rotation of the gear box 271 causes rotation of the sleeve 273a and shaft 273b, which in turn effect rotation of the jack head 275 and jack screw 277a, thereby resulting in translation of the threaded sleeve 277b and the fan nozzle segment 54. The direction of rotation of the gear box 271 dictates whether the threaded sleeve 277b and fan nozzle segment 54 move in a forward or rearward direction.

As shown in FIG. 11, the extensible portion 277 of the VAFN actuator 270 can include a jack screw 277a having a forward end rotatably coupled to the jack head 275, and an internally threaded sleeve 277b that is threadably engaged with the jack screw 277a and includes an aft end 279 connected to a support 251 on the fan nozzle segment 54. The connection between the aft end 279 and the support 251 prevents rotation of the threaded sleeve 277b. Accordingly, rotation of the jack screw 277a by the jack head 275 causes the sleeve 277b to translate in a fore or aft direction on the jack screw 277a, thus causing associated displacement of the attached fan nozzle segment 54.

Figure 12:
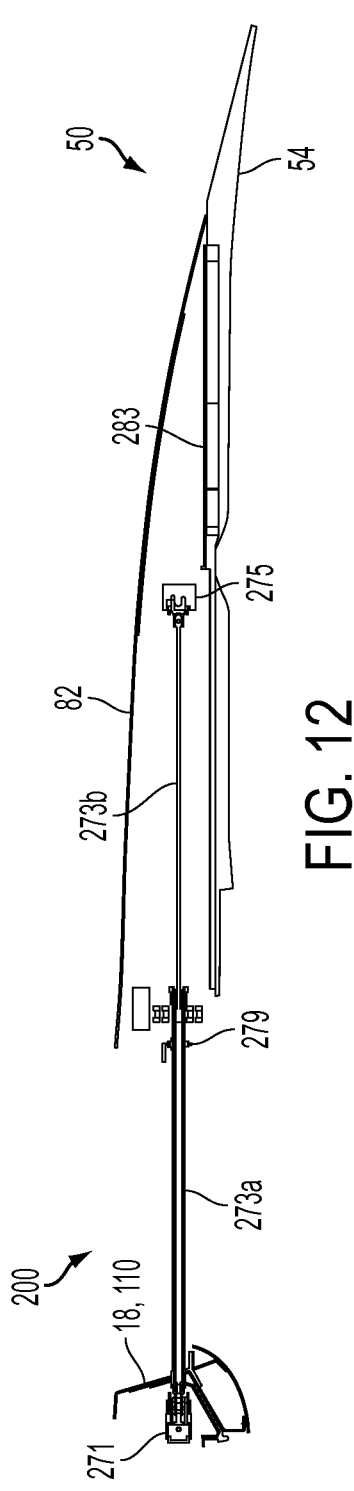
FIG. 12 is a cross-sectional view similar to that shown in FIG. 10 with the thrust reverser in a deployed position and the VAFN nozzle in the stowed position.

FIG. 12 shows the telescoping coupling 273 of the actuator 270 with the thrust reverser sleeve section 82 in its deployed position. In this position, the shaft 273b outwardly extends from sleeve 273a, and at least a portion of the shaft 273b remains engaged within the sleeve 273a. The gear box 271 remains rotatably coupled to the jack head 275 by the telescoping coupling 273.

Figure 13:
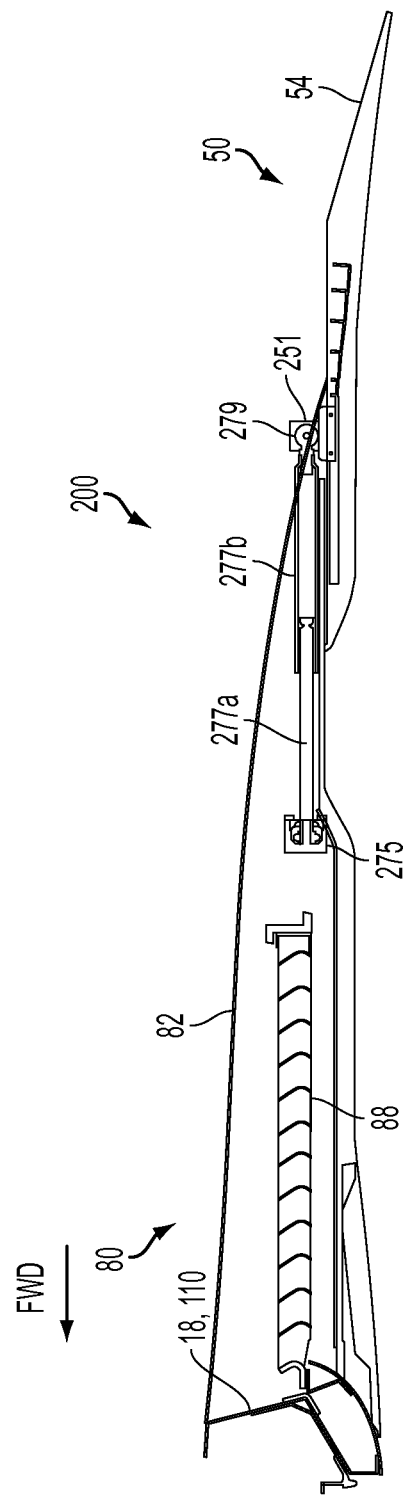
FIG. 13 is a cross-sectional view similar to that shown in FIG. 11 with the thrust reverser in the stowed position and the VAFN nozzle in a deployed position.

FIG. 13 shows the extensible portion 277 of the actuator 270 in an extended position, and the thrust reverser sleeve section 82 in its deployed position. When extended, the threaded sleeve 277b displaces the fan nozzle segment 54 away from the torque box 110 and the thrust reverser sleeve section 82. At least a portion of the sleeve 277b remains threadably engaged on the jack screw 277a when the sleeve 277b is fully extended.

Figure 14:
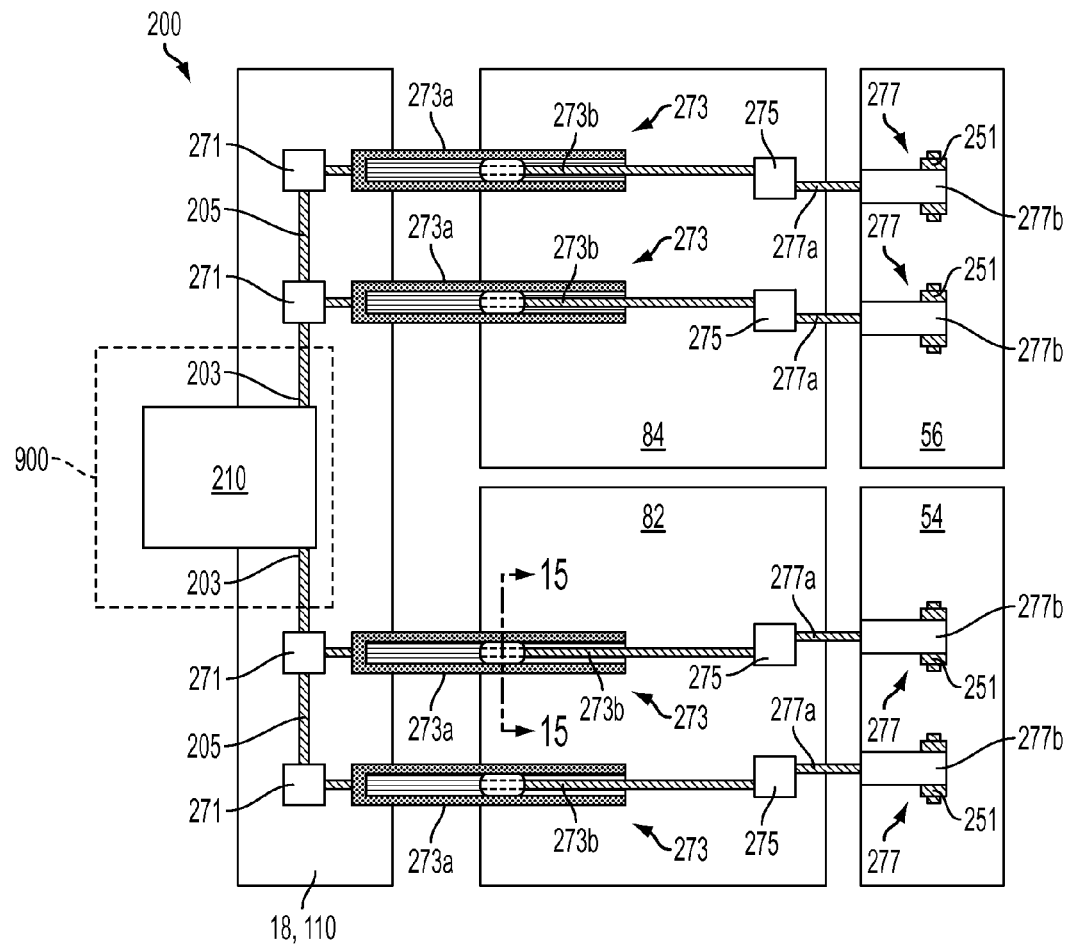
FIG. 14 is a schematic diagram showing the first embodiment of a VAFN actuation system.

FIG. 14 is a schematic diagram of one embodiment of a VAFN actuation system 200 that incorporates a plurality of VAFN actuators 270 as described above. The actuation system 200 can be used in a turbofan engine 10 having a cascade-type thrust reverser 80 like that previously described, and to translate one or more fan nozzle segments 54, 56 between their stowed and deployed positions. In the actuator system 200 shown schematically in FIG. 14, a pair of translating thrust reverser sleeve sections 82, 84 are movably disposed aft of a nacelle torque ring 110, and a pair of translating fan nozzle segments 54, 56 are movably disposed aft of the sleeve sections 82, 84. Each fan nozzle segment 54, 56 is positioned in its stowed and deployed positions by one or more VAFN actuators 270. Each VAFN actuator can include a gear box 271, a telescoping coupling 273 having a non-translating portion 273a and a movable portion 273b, a jack head 275, and an extensible portion 277 having an extensible sleeve 277b. The telescoping coupling 273 permits fore and aft movement of the thrust reverser sleeve sections 82, 84 while maintaining rotational engagement between the gear box 271 and the jack head 275. In this embodiment 200, the longitudinal axes of the telescoping coupling 273 and the extensible portion 277 are laterally offset from each other. This offset permits the jack head 275 to be configured such that the rotational speed and/or output torque provided to the extensible portion 277 by the jack head 275 can be different than the rotational speed and or torque provided to the jack head 275 by the gear box 271 and the telescoping coupling 273.

The plurality of VAFN actuators 270 can be connected to a power drive unit (PDU) 210. The PDU 210 can be affixed to an engine pylon 900 represented by dashed lines in FIG. 14. Flexible drive shafts 203 rotatably connect first gear boxes 271 to the PDU 210, and flexible transmission shafts 205 rotatably connect gear boxes 271 not directly connected to the PDU. When actuated, the PDU 210 drives the shafts 203, 205 and interconnected gear boxes 271, thereby simultaneously actuating the VAFN actuators 270 and effecting desired simultaneous movement of the fan nozzle segments 54, 56 in a forward or aft direction. The telescoping couplings 273 are configured to couple the jack screws 277a to the PDU 210 while also accommodating substantial translational displacement between the input ends of the jack screws 277a and the power drive unit 210. Other means can also be used to couple the jack screws 277a to the PDU 210 in a manner that permits substantial translational displacement between the input ends of the jack screws 277a and the power drive unit 210.

Figure 15:
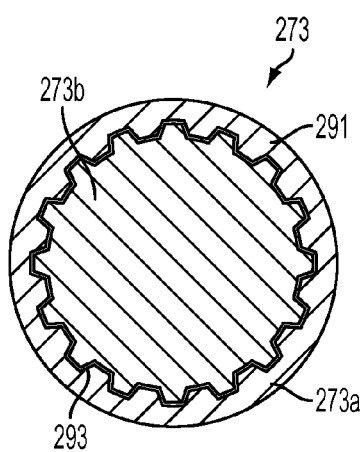
FIG. 15 is a cross section taken along line 15-15 in FIG. 14.

As described above, the shafts 273b of the telescoping couplings 273 can be slidably received within their respective sleeves 273a while also being rotatably coupled to the sleeves 273b. One configuration of the sleeves 273a and shafts 273b that permits sliding movement and provides rotational coupling is shown in FIG. 15. In this configuration, at least a portion of each shaft 273b can include a plurality of circumferentially-spaced ridges or splines 291. The mating sleeves 273a can each include a plurality of circumferentially-spaced longitudinal grooves 293 that extend along a substantial portion of the length of the sleeve 273a. When the splines 291 are engaged with the grooves 293, each shaft 273b is substantially free to move longitudinally within its mating sleeve 273a, but is restrained against substantial rotation relative to its respective sleeve 273a. Accordingly, the telescoping couplings 273 accommodate movement of the fan nozzle segments 54, 56 with the thrust reverser sleeve sections 82, 84 when the thrust reverser sleeve segments are deployed while also maintaining rotational coupling between the stationary gear boxes 271 and displaced jack heads 275.

Figure 16:
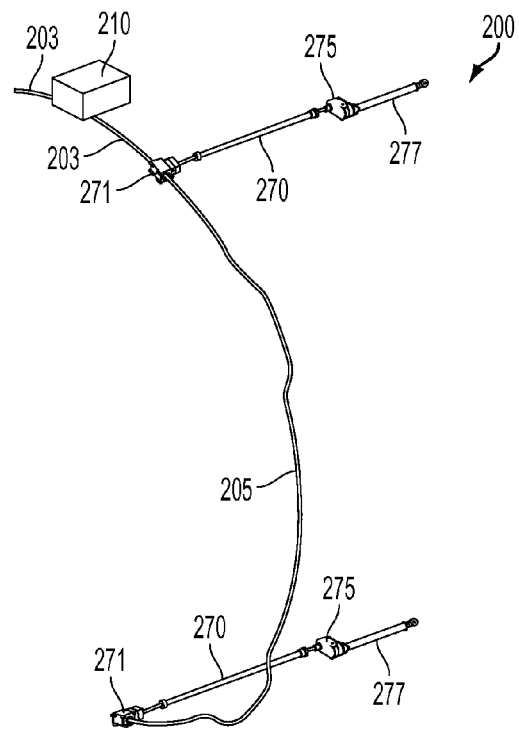
FIG. 16 is a perspective view of a portion of the VAFN actuation system shown in FIG. 14.
Figure 17:
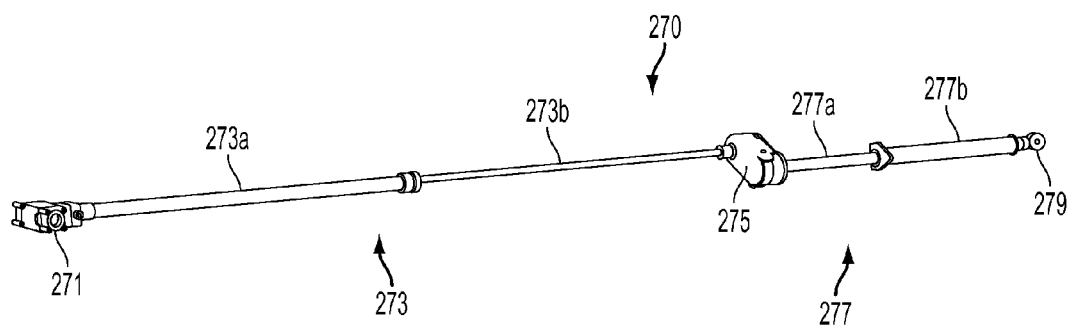
FIG. 17 is a perspective view of one embodiment of an actuator for use in the VAFN actuation system shown in FIGS. 9-15.

FIG. 16 shows an isolated portion of the VAFN actuation system 200. Though the actuation system 200 can include two actuators 270 on each side of the PDU 210 (only one side is shown in FIG. 16), the system 200 can alternatively include a single actuator 270 or more than two actuators 270 on either side. FIG. 17 shows one embodiment of an actuator 270 for use in the VAFN actuation system 200 described above. In FIG. 17, the telescoping coupling 273 and the extensible portion 277 are both shown in their fully extended positions. In the configuration shown, the positions of the sleeve 273a and the shaft 273b can be reversed, if desired. In addition or alternatively, the positions of the jack screw 277a and threaded sleeve 277b can be reversed from that shown in FIG. 17.

Figure 18:
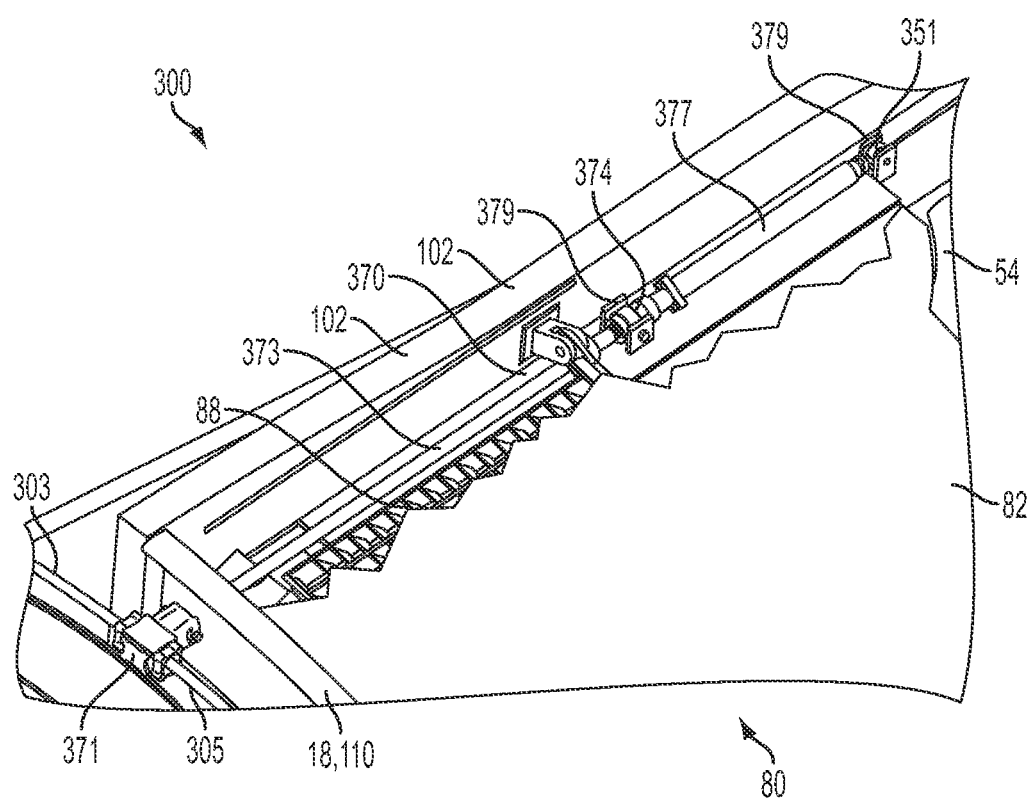
FIG. 18 is a perspective view of a portion of a second embodiment of a VAFN actuation system for selectively translating a variable area fan nozzle like that shown in FIGS. 1-8.

Another embodiment of a VAFN actuation system 300 according to the invention is shown in FIGS. 18-22. This embodiment 300 can be substantially similar to the VAFN system 200 described above except for the differences described below. As shown in FIG. 18, a thrust reverser 80 can include at least one translating thrust reverser sleeve section 82 that is movably mounted aft of a torque ring 110 of a stationary nacelle portion 18. When the thrust reverser sleeve section 82 is in the stowed position shown in FIG. 18, the sleeve section 82 is positioned immediately aft of the torque ring 110, and the sleeve section 82 covers the cascade array 88. A fan nozzle segment 54 is movably disposed aft of the thrust reverser sleeve section 82. The fan nozzle segment 54 and the thrust reverser sleeve section 82 can be movably supported by a track beam assembly 102 like that shown in FIG. 7, for example.

As shown in FIG. 18, one embodiment of a VAFN actuation system 300 according to the invention can include one or more VAFN actuators 370. The VAFN actuator 370 can generally include a gear box 371, a telescoping coupling 373, and an extensible portion 377. The gear box 371 can be mounted to the nacelle's stationary torque box 110, for example. In the embodiment shown in FIG. 18, the gear box 371 is located proximate to the track beam assembly 102.

The telescoping coupling 373 is rotatably coupled to the gear box 371 and rearwardly extends between the gear box 371 and an inline coupling 374. The inline coupling 374 can be positioned proximate to an aft end of the thrust reverser sleeve segment 82, and can be connected to the sleeve segment 82 by a bracket 379. Accordingly, the inline coupling 374 moves with the thrust reverser sleeve segment 82 as the sleeve segment 82 is moved between its stowed and deployed positions. The extensible portion 377 of the VAFN actuator 370 is disposed between the inline coupling 374 and a support 351 on the fan nozzle segment 54. As described below, the extensible portion 377 is configured to move the fan nozzle segment 54 between its forward stowed position and its aft deployed position. In the embodiment shown in FIG. 18, the extensible portion 377 and the telescoping coupling 373 are axially aligned with each other.

Figure 19:
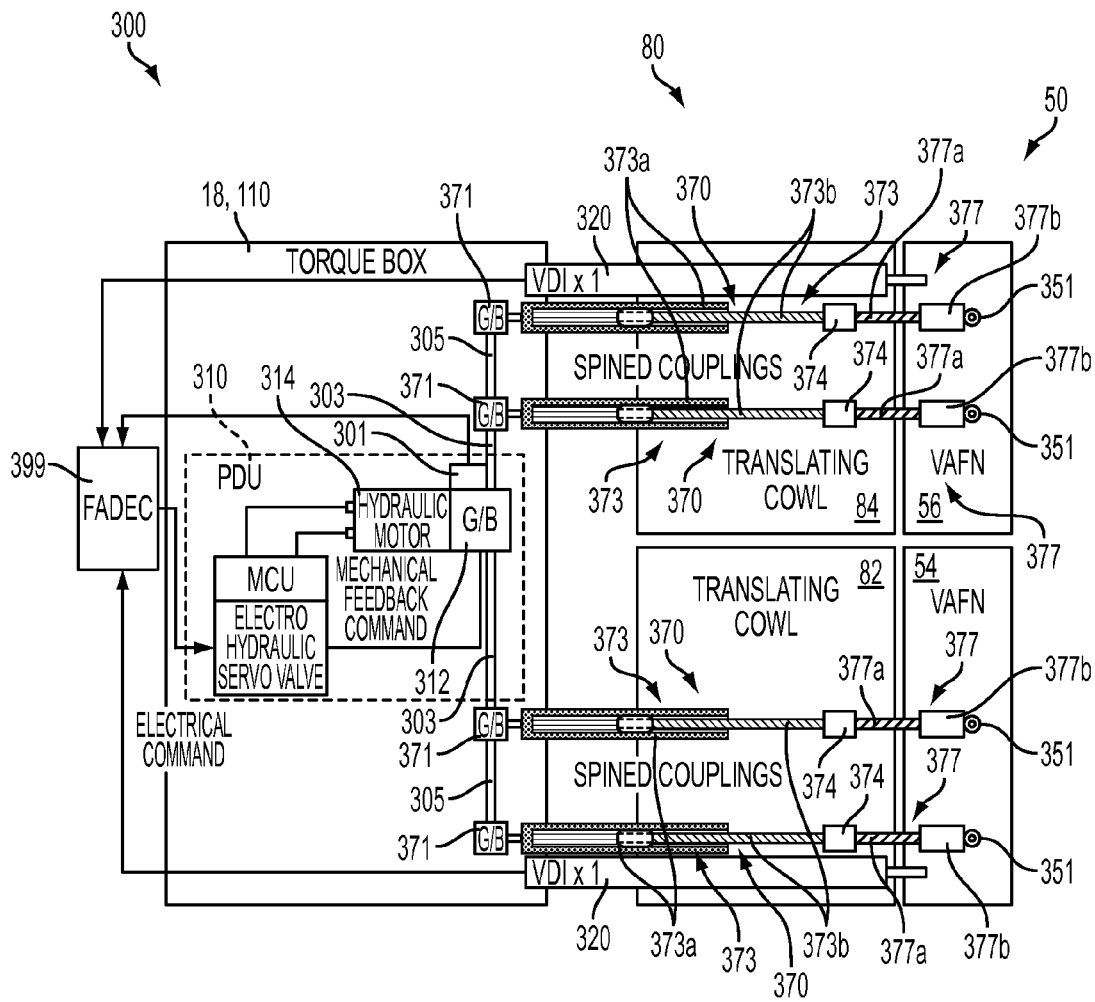
FIG. 19 is a schematic diagram showing the second embodiment of a VAFN actuation system.

FIG. 19 is a schematic diagram of one embodiment of the VAFN actuation system 300 that incorporates a plurality of VAFN actuators 370 as described above. The actuation system 300 can be used in a turbofan engine 10 having a cascade-type thrust reverser 80 like that previously described, and to translate one or more fan nozzle segments 54, 56 between their stowed and deployed positions. In the actuator system 300 shown schematically in FIG. 19, a pair of translating thrust reverser sleeve sections 82, 84 are movably disposed aft of a nacelle 18 and torque ring 110, and a pair of translating fan nozzle segments 54, 56 are movably disposed aft of the sleeve sections 82, 84. Each fan nozzle segment 54, 56 is positioned in its stowed and deployed positions by one or more VAFN actuators 370. Each VAFN actuator can include a gear box 371, a telescoping coupling 373 having a non-translating portion 373a and a movable portion 373b, an inline coupling 374, and an extensible portion 377 having an extensible sleeve 377b. The telescoping coupling 373 permits fore and aft movement of the thrust reverser sleeve sections 82, 84 while maintaining rotational engagement between the gear box 371 and the inline coupling 374. In this embodiment 300, the longitudinal axes of the telescoping coupling 373 and the extensible portion 377 are axially aligned, and the coupling 373 and extensible portion 377 are directly connected together without any intervening gears or transmission. Accordingly, the rotational speed and/or output torque provided to the extensible portion 377 by the inline coupling 374 is substantially the same as the rotational speed and/or torque provided to the coupling 374 by the gear box 371 and the telescoping coupling 373.

As shown in FIG. 19, the VAFN actuators 370 can be connected to a power drive unit (PDU) 310. Flexible drive shafts 303 can rotatably connect adjacent gear boxes 371 to the PDU 310, and flexible transmission shafts 305 can rotatably connect gear boxes 371 that are not directly connected to the PDU 310. The PDU 310 can include a power gear box 312 driven by a motor 314. When actuated, the PDU 310 drives the shafts 303, 305 and interconnected gear boxes 371, thereby simultaneously actuating the VAFN actuators 370 and effecting desired simultaneous movement of the fan nozzle segments 54, 56 in a forward or aft direction. The non-translating portion 373a and the movable portion 373b of the actuators 370 can be rotatably coupled together by a splined configuration similar to that shown in FIG. 15.

FIG. 19 also shows a schematic representation of a control system for use with a VAFN actuation system 300. In the embodiment shown, one or more linear variable displacement transducers (LVDTs) 320 can be positioned to detect the positions of the fan nozzle segments 54, 56 relative to the nacelle 18 and torque box 110, and/or to the thrust reverser sleeve segments 82, 84. The LVDTs 320 can be connected to an automatic control system 399 that controls operation of the PDU 310. For example, the LVDTs 320 can be operably connected to a Full Authority Digital Engine Control (FADEC) system. Inputs from the LVDTs 320 can be used by the control system 399 to determine when the fan nozzle segments 54, 56 are in there fully stowed or fully deployed positions, for example, and to control operation of the PDU 310 accordingly. Alternatively or in addition, the PDU 310 can be equipped with one or more rotary variable displacement transducers (RVDTs) 301 to detect when predetermined rotational displacement limits for the PDU 310 have been reached.

Figure 20:
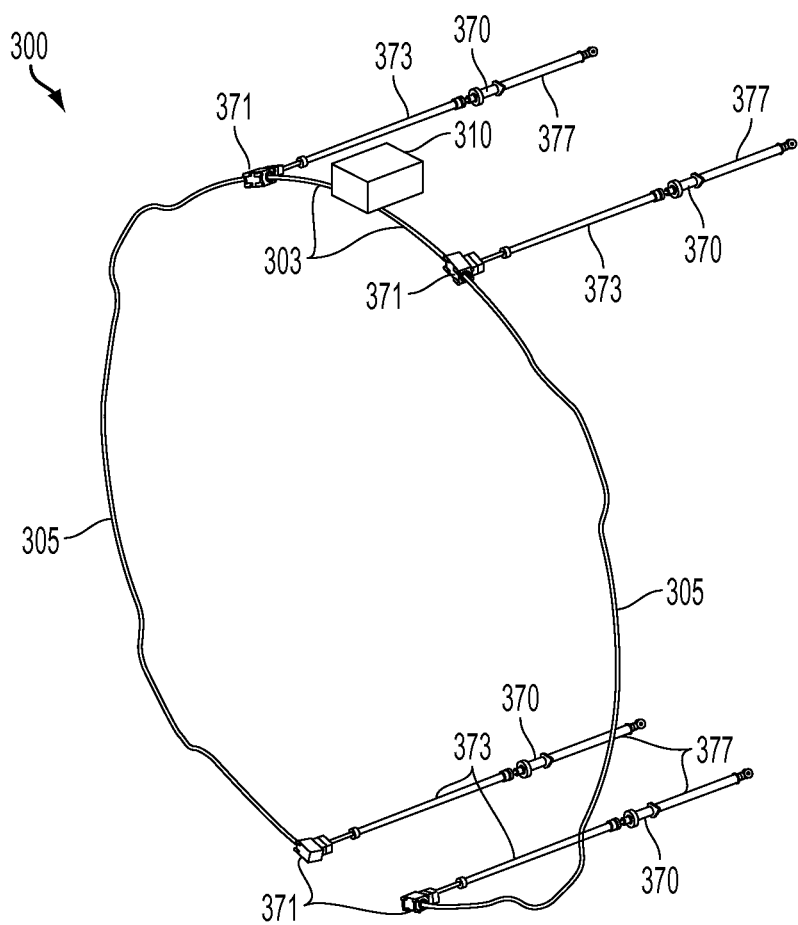
FIG. 20 is a perspective view of the second embodiment of a VAFN actuation system shown in FIGS. 18-19.

FIG. 20 shows the VAFN actuation system 300 separated from an associated thrust reverser 80 and fan nozzle assembly 50. Though the actuation system 300 can include two actuators 370 on each side of the PDU 310 as shown in FIGS. 19-20, the system 300 can alternatively include a single actuator 370 or more than two actuators 370 on either side.

FIG. 21 shows a VAFN actuator 370 and an associated thrust reverser sleeve section 82 in its deployed position. In the configuration shown in FIG. 21, a shaft 373a is coupled to the gear box 371, and a mating extendable sleeve 373b is connected to the coupling 374. When the thrust reverser sleeve 82 is deployed, the sleeve 373b of the actuator 370 rearwardly extends from the mating shaft 373a, and at least a portion of the sleeve 373b remains engaged on the shaft 373a. The gear box 371 remains rotatably connected to the inline coupling 374 by the telescoping coupling 373.

FIG. 22 shows the extensible portion 377 of the actuator 370 in an extended position, and the fan nozzle segment 54 in a deployed position. When extended, the threaded sleeve 377b displaces the fan nozzle segment 54 away from the torque ring 110 and the thrust reverser sleeve section 82. At least a portion of the threaded sleeve 377b remains threadably engaged on the jack screw 377a when the sleeve 377b is fully extended.

Figure 23:
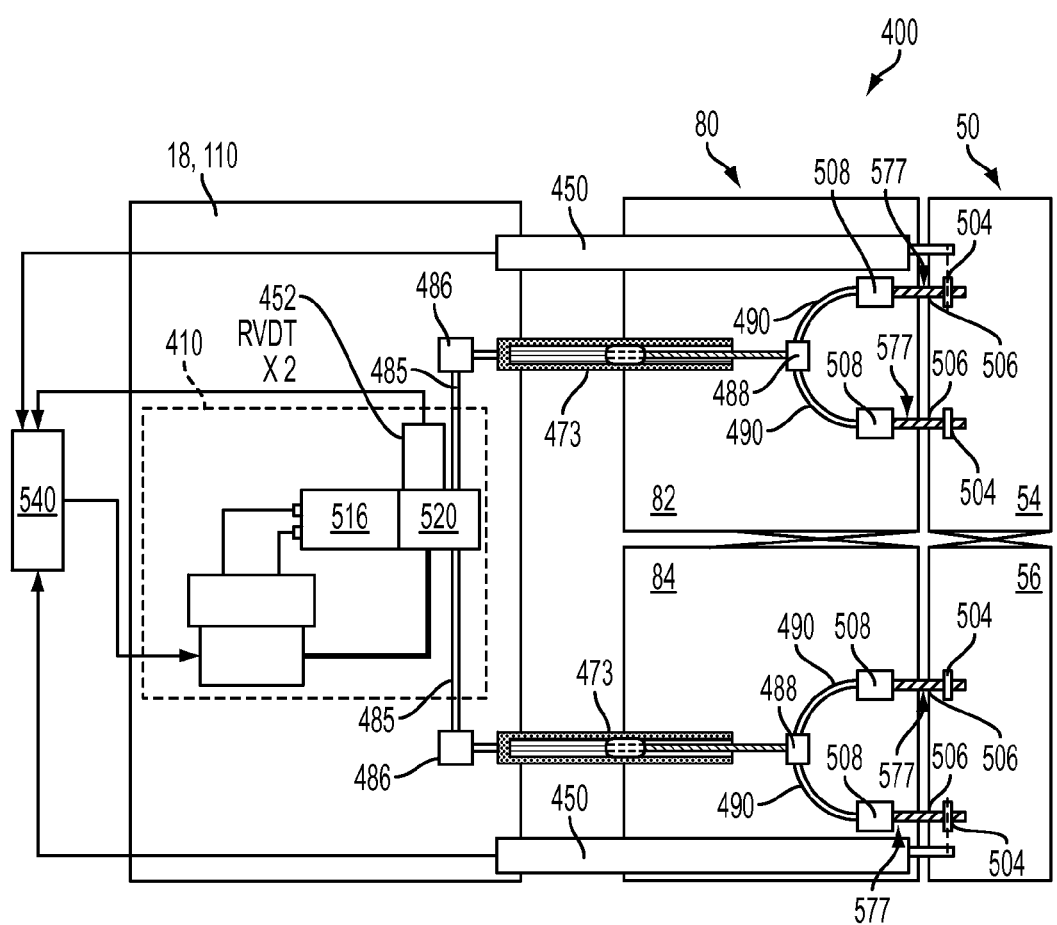
FIG. 23 is a schematic diagram of a third embodiment of a VAFN actuator system according to the invention.

Another embodiment of a VAFN actuation system 400 according to the invention is shown schematically in FIG. 23. The actuation system 400 can be used in a turbofan engine having a cascade-type thrust reverser 80 like that previously described, and to translate one or more fan nozzle segments 54, 56 between their stowed and deployed positions. In the actuator system 400 shown schematically in FIG. 23, a pair of translating thrust reverser sleeve sections 82, 84 are movably disposed aft of a nacelle 18 and torque ring 110, and a pair of translating fan nozzle segments 54, 56 are movably disposed aft of the sleeve sections 82, 84. Each fan nozzle segment 54, 56 is positioned in its stowed and deployed positions by the VAFN actuator system 400. In this embodiment, a PDU 410 can include a gear box 520 driven by a motor 516. The motor 516 can be hydraulic, electric, pneumatic, or the like. The PDU gear box 520 is rotatably coupled to a pair of actuator gear boxes 486 by flexible drive shafts 485. Each actuator gear box 486 is rotatably coupled to a transmission 488 by a telescoping coupling 473. The telescoping couplings 473 can be like the telescoping couplings 273, 373 described above, for example. Two or more extensible actuators 577 are rotatably coupled to each transmission 488 by actuator shafts 490. The actuators 577 can each include a jack head 508, a jack screw 506, and a translating threaded sleeve 504 connected to a fan nozzle segment 54, 56. The telescoping couplings 473 permit translation of the thrust reverser sleeve segments 82, 84 while maintaining rotational engagement between the actuator gear boxes 486 and the transmissions 488 and extensible actuators 577. Rotation of the actuator gear boxes 486 by the PDU 410 results in rotation of the telescoping couplings 473 and the transmissions 488. The transmissions 488 in turn drive the actuators 577, which effect desired displacement of the fan nozzle segments 54, 56. The system 400 can include one or more LVDTs 450 and/or one or more RVDTs 452 to provide control feedback to a control processor 540 for use in controlling operation of the PDU 410.

Persons of ordinary skill in the art will understand that while the invention has been described in terms of various embodiments and various aspects and features, certain modifications, variations, changes and additions can be made to the described embodiments without departing from the spirit and scope of the invention. All such modifications, variations, changes and additions are intended to be within the scope of the appended claims.

What is claimed is:

1. An actuator for a translating variable area fan nozzle comprising:
    a power drive unit;
    an extensible portion comprising a jack screw and a translating threaded sleeve threadably engaged with the jack screw;
    a single telescoping coupling rotatably coupled to the extensible portion, wherein the length of the telescoping coupling can be altered between a first length and a second length that is longer than the first length while maintaining rotational engagement with the extensible portion; and
    a jack head coupling the telescoping coupling and the extensible portion, wherein a first longitudinal axis of the extensible portion is offset from a second longitudinal axis of the telescoping coupling,
    wherein the extensible portion is rotatably coupled to the power drive unit through the jack head and the telescoping coupling such that the telescoping coupling has a first rotational speed and the extensible portion has a second rotational speed that is different from the first rotational speed.

2. The actuator of claim 1 wherein the telescoping coupling is rotatably coupled to the extensible portion by the jack head.

3. The actuator of claim 1 wherein the telescoping coupling comprises a shaft that is slidably received in an elongated sleeve, and wherein at least a portion of the shaft includes splines that are slidably received in grooves within the elongated sleeve, wherein the splines and grooves substantially prevent relative rotation between the shaft and elongated sleeve when the shaft is received in the elongated sleeve.

4. An actuator system for selectively displacing a translating variable area fan nozzle between a stowed position and a deployed position, the system comprising:
    an actuator comprising a telescoping coupling and an extensible portion, the extensible portion comprising a jack screw;
    a power drive unit operably connected to the jack screw through the telescoping coupling;
    a jack head coupling the telescoping coupling and the extensible portion, wherein a first longitudinal axis of the extensible portion is offset from a second longitudinal axis of the telescoping coupling,
    wherein the extensible portion is rotatably coupled to the power drive unit through the jack head and the telescoping coupling such that the telescoping coupling has a first rotational speed and the extensible portion has a second rotational speed that is different from the first rotational speed.

5. The actuator system of claim 4 wherein the jack screw has a first axis and wherein the first axis of the jack screw is offset from the second longitudinal axis of the telescoping coupling.

6. The actuator system of claim 4 wherein rotation of the telescoping coupling at the first rotational speed is configured to cause rotation of the jack screw at the second rotational speed.

7. The actuator system of claim 6 wherein the telescoping coupling comprises a shaft that is slidably received in an elongated sleeve, and wherein at least a portion of the shaft includes splines that are slidably received in grooves within the elongated sleeve, wherein the splines and grooves substantially prevent relative rotation between the shaft and elongated sleeve when the shaft is received in the elongated sleeve.

8. The actuator system of claim 4 wherein the telescoping coupling is connected to the power drive unit by one or more flexible shafts.

* * * * *